(12) United States Patent
Okabe

(10) Patent No.: US 12,398,539 B2
(45) Date of Patent: Aug. 26, 2025

(54) WORK MACHINE

(71) Applicant: KOMATSU LTD., Tokyo (JP)

(72) Inventor: Kazuyoshi Okabe, Tokyo (JP)

(73) Assignee: KOMATSU LTD., Tokyo (JP)

( * ) Notice: Subject to any disclaimer, the term of this patent is extended or adjusted under 35 U.S.C. 154(b) by 287 days.

(21) Appl. No.: 18/004,370

(22) PCT Filed: Jul. 19, 2021

(86) PCT No.: PCT/JP2021/027034
§ 371 (c)(1),
(2) Date: Jan. 5, 2023

(87) PCT Pub. No.: WO2022/070563
PCT Pub. Date: Apr. 7, 2022

(65) Prior Publication Data
US 2023/0287656 A1  Sep. 14, 2023

(30) Foreign Application Priority Data
Sep. 30, 2020 (JP) ................................ 2020-165735

(51) Int. Cl.
*E02F 9/22* (2006.01)
*E02F 9/08* (2006.01)
*G01N 21/94* (2006.01)

(52) U.S. Cl.
CPC ............ *E02F 9/226* (2013.01); *E02F 9/0866* (2013.01); *E02F 9/2296* (2013.01); *G01N 21/94* (2013.01); *G01N 2021/945* (2013.01)

(58) Field of Classification Search
CPC ....... E02F 9/226; E02F 9/0866; E02F 9/2296; G01N 21/94; G01N 2021/945
See application file for complete search history.

(56) References Cited

U.S. PATENT DOCUMENTS

2010/0073479 A1    3/2010  Uto et al.
2014/0104426 A1*   4/2014  Boegel ................... B60R 11/04
                                                 348/148
(Continued)

FOREIGN PATENT DOCUMENTS

JP    2012-132988 A    7/2012
JP    3219005 U       10/2018
(Continued)

OTHER PUBLICATIONS

The International Search Report for the corresponding international application No. PCT/JP2021/027034, issued on Oct. 5, 2021.
(Continued)

*Primary Examiner* — Peter D Nolan
*Assistant Examiner* — Mikko Okechukwu Obioha
(74) *Attorney, Agent, or Firm* — GLOBAL IP COUNSELORS, LLP

(57) ABSTRACT

A work machine including a vehicle body configured to travel, a fan, an obstacle detection device, and a controller. The fan is configured to exchange air between an inside and an outside of the vehicle body through an opening provided toward a rear of the vehicle body. The obstacle detection device is installed behind the fan. The obstacle detection device is configured to detect an obstacle in the rear of the vehicle body. The controller is configured to control intake and exhaust of the fan based on a state of the obstacle detection device.

11 Claims, 10 Drawing Sheets

(56) References Cited

U.S. PATENT DOCUMENTS

| | | | |
|---|---|---|---|
| 2015/0017901 A1* | 1/2015 | Pfohl | E02F 9/2095 |
| | | | 180/68.2 |
| 2015/0145956 A1 | 5/2015 | Hayakawa et al. | |
| 2018/0118015 A1* | 5/2018 | Solazzo | B60K 11/04 |
| 2019/0272687 A1* | 9/2019 | Dudar | F01P 5/043 |
| 2019/0351879 A1 | 11/2019 | Kim et al. | |
| 2020/0011025 A1* | 1/2020 | Hyodo | E02F 9/226 |

FOREIGN PATENT DOCUMENTS

| | | |
|---|---|---|
| JP | 2020-90838 A | 6/2020 |
| WO | 2014/017519 A1 | 1/2014 |

OTHER PUBLICATIONS

The extended European search report for the corresponding European application No. 21874867.1 dated Jun. 13, 2024.

\* cited by examiner

WORK MACHINE

CROSS-REFERENCE TO RELATED APPLICATIONS

This application is a U.S. National stage application of International Application No. PCT/JP2021/027034, filed on Jul. 19, 2021. This U.S. National stage application claims priority under 35 U.S.C. § 119(a) to Japanese Patent Application No. 2020-165735, filed in Japan on Sep. 30, 2020, the entire contents of which are hereby incorporated herein by reference.

BACKGROUND

Technical Field

The present invention relates to a work machine.

Background Information

Collision suppression system has been proposed for detecting an obstacle to the rear and suppressing a collision in a work machine such as a wheel loader (for example, see Registration of Utility Model No. 3219005).

In such a collision suppression system, a detection device such as a radar is provided at the rear end of the work machine.

Further, in the wheel loader, an engine room is provided at the rear of the vehicle. A fan for cooling the engine cooling water is disposed in the rear part of the engine room. By driving the fan, air is taken in or exhausted between the inside and outside of the engine room through an opening formed at the rear end of the engine room.

SUMMARY

However, when the detection device is installed on the rear end side of the vehicle relative to the fan, for example, in the case of being configured to cool at the time of exhaust, high-temperature air warmed inside the engine room hits the detection device. As a result, the temperature of the detection device may exceed the operating range and the detection performance of the detection device may deteriorate. In addition, in the case of being configured to cool at the time of intake, external dust or the like may adhere to the surface of the detection device, deteriorating the detection performance.

An object of the present disclosure is to provide a work machine capable of suppressing deterioration in performance for detecting an obstacle in the rear.

A work machine according to a disclosure includes a vehicle body configured to travel, a fan, an obstacle detection device, and a controller. The fan exchanges air between an inside and an outside of the vehicle body through an opening provided toward a rear of the vehicle body. The obstacle detection device is installed behind the cooling device and detects an obstacle in the rear of the vehicle body. The controller controls intake and exhaust of the fan based on a state of the obstacle detection device.

According to the present disclosure, it is possible to provide a work machine capable of suppressing deterioration in the performance of detecting an obstacle in the rear.

DESCRIPTION OF EMBODIMENTS

A wheel loader as an example of a work machine according to the present disclosure will be described below with reference to the drawings.

Embodiment 1

(Outline of Wheel Loader)

Figure 1:
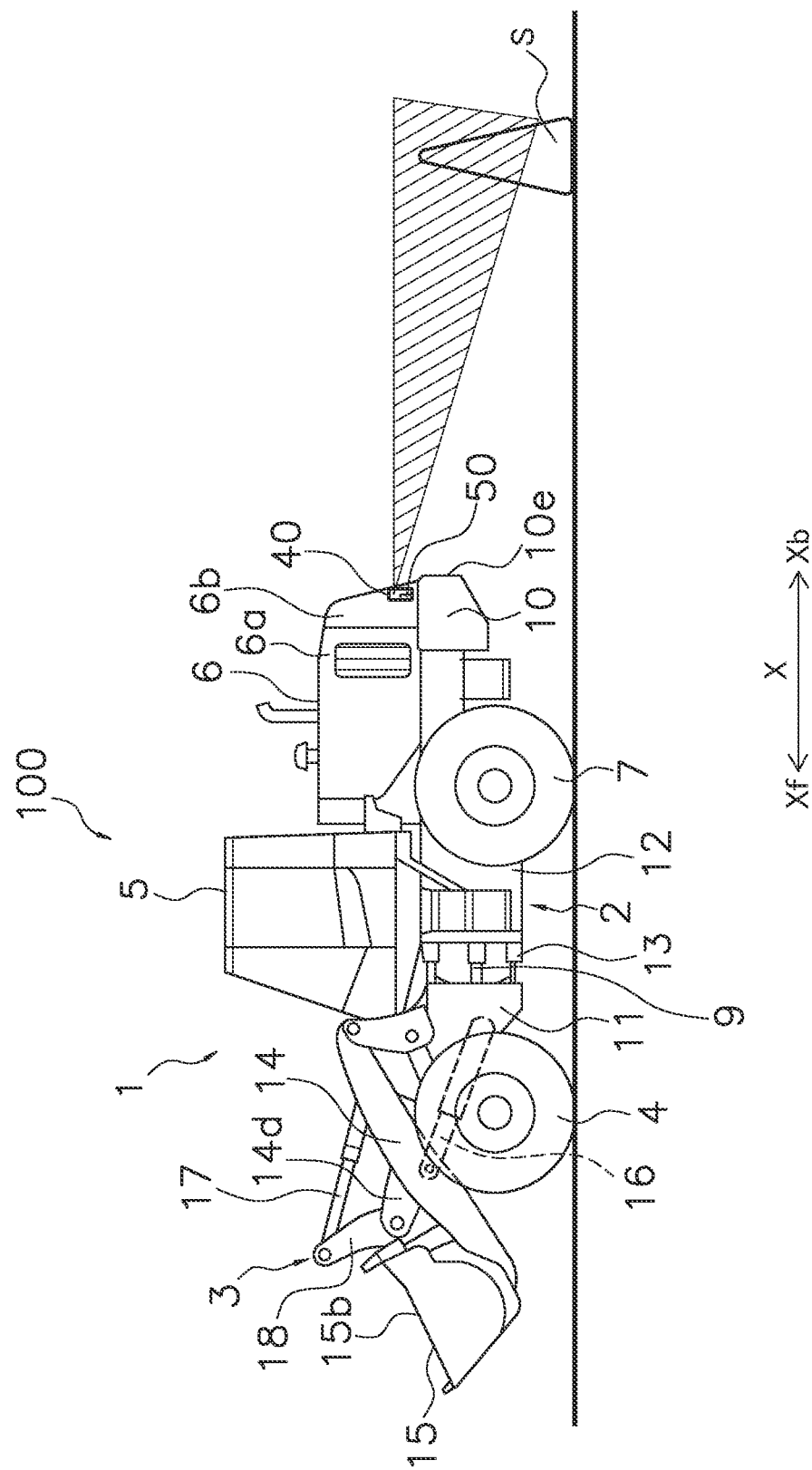
FIG. 1 is a side view of a wheel loader of a first embodiment according to the present disclosure.

FIG. 1 is a side view illustrating the wheel loader 100 (an example of a work machine) of present embodiment.

Figure 4:
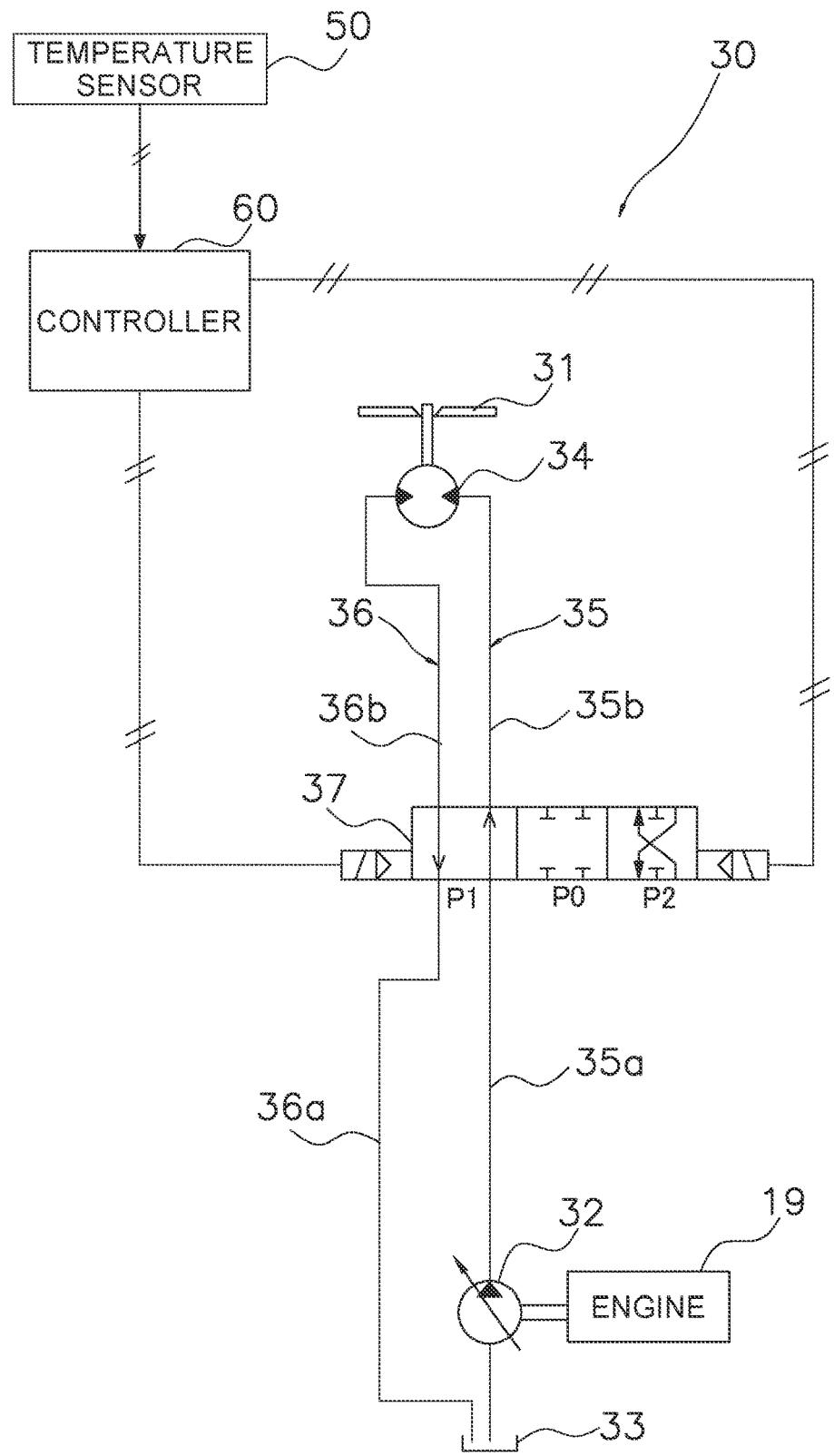
FIG. 4 is a diagram illustrating configurations of a cooling device and a control system in the wheel loader of the first embodiment according to the present disclosure.

The wheel loader 100 of the present embodiment includes a vehicle body 1, a cooling device 30 (see FIG. 4), a radar device 40 (an example of an obstacle detection device), a temperature sensor 50, and a controller 60 (see FIG. 4).

The vehicle body 1 is able to travel. The cooling device 30 cools the cooling water of the engine of the vehicle body 1 and the like. The radar device 40 detects an obstacle in a rear of the vehicle body 1. A temperature sensor 50 measures the temperature of the radar device 40. The controller 60 controls intake and exhaust of the cooling device 30 based on the detected value of the temperature sensor 50.

A vehicle body 1 includes a vehicle body frame 2, a work implement 3, a pair of front tires 4 (an example of traveling wheels), a cab 5, an engine room 6, a pair of rear tires 7 (an example of traveling wheels), a steering cylinder 9, and a counterweight 10.

In the following description, "front", "rear", "right", "left", "up", and "down" indicate directions relative to a state of looking forward from the driver's seat. Also, "vehicle width direction" and "left-right direction" have the same meaning. In FIG. 1, the front-rear direction is indicated by X, the front direction is indicated by Xf, and the rear direction is indicated by Xb.

The wheel loader 100 performs work such as earth and sand loading by using the work implement 3.

The vehicle body frame 2 is a so-called articulated construction and includes a front frame 11, a rear frame 12, and a coupling shaft part 13. The front frame 11 is disposed in front of the rear frame 12. The coupling shaft part 13 is provided in the center in the vehicle width direction and couples the front frame 11 and the rear frame 12 to each other in a manner that allows swinging. The pair of front tires 4 are attached to the left and right of the front frame 11. The pair of rear tires 7 are attached to the left and right of the rear frame 12.

The work implement 3 is driven by hydraulic fluid from a work implement pump (not shown). The work implement 3 is attached to the front part of the front frame 11 in a manner that allows swinging. The work implement 3 includes a boom 14, a bucket 15, a lift cylinder 16, a bucket cylinder 17, and a bell crank 18.

The base end of the boom 14 is rotatably attached to a front part of the front frame 11. The tip end of the boom 14 is rotatably attached to a rear part of the bucket 15. The rear part of the bucket 15 is on the opposite side from an opening 15b. The tip end of a cylinder rod of the lift cylinder 16 is rotatably attached between the base end and the tip end of the boom 14. The cylinder body of the lift cylinder 16 is rotatably attached to the front frame 11.

One end part of the bell crank 18 is rotatably attached to the tip end of a cylinder rod of the bucket cylinder 17. The other end part of the bell crank 18 is rotatably attached to a rear part of the bucket 15. The bell crank 18 is rotatably supported by a bell crank support 14d near the middle of the boom 14 between either end. The cylinder body of the bucket cylinder 17 is rotatably attached to the front frame 11. The extension/contraction force of the bucket cylinder 17 is converted to rotational movement by the bell crank 18 and is transmitted to the bucket 15.

The bucket 15 is rotatably attached to the tip end of the boom 14 so as to open toward the front. By extending and contracting the bucket cylinder 17, the bucket 15 rotates with respect to the boom 14 and performs a tilting motion and a dumping motion.

The cab 5 is disposed on the rear frame 12. A steering handle for performing steering operations, a lever for operating the work implement 3, and various display devices are disposed inside the cab 5. The engine room 6 is disposed to the rear of the cab 5 and on the rear frame 12 and accommodates an engine (not shown).

The counterweight 10 is provided at the rear part of the rear frame 12. The counterweight 10 is disposed below the engine room 6. A part of the counterweight 10 is located in the rear of the engine room 6. A rear end 10e which is an end of the counterweight 10 on the rear direction Xb side corresponds to a rear end of the wheel loader 100.

(Cooling Device 30)

Figure 2A:
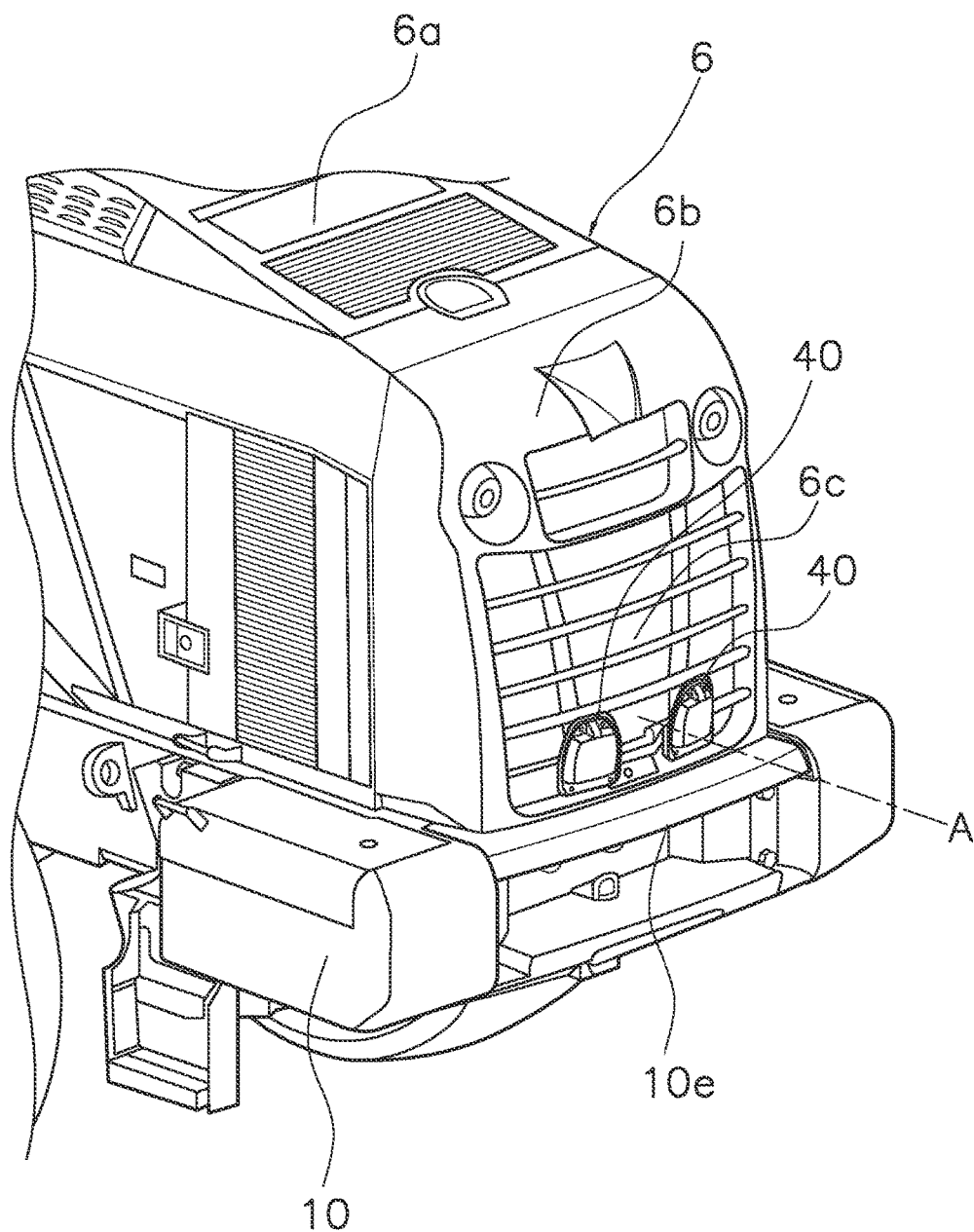
FIG. 2A is a perspective view illustrating the rear part of the wheel loader of the first embodiment according to the present disclosure.
Figure 3:
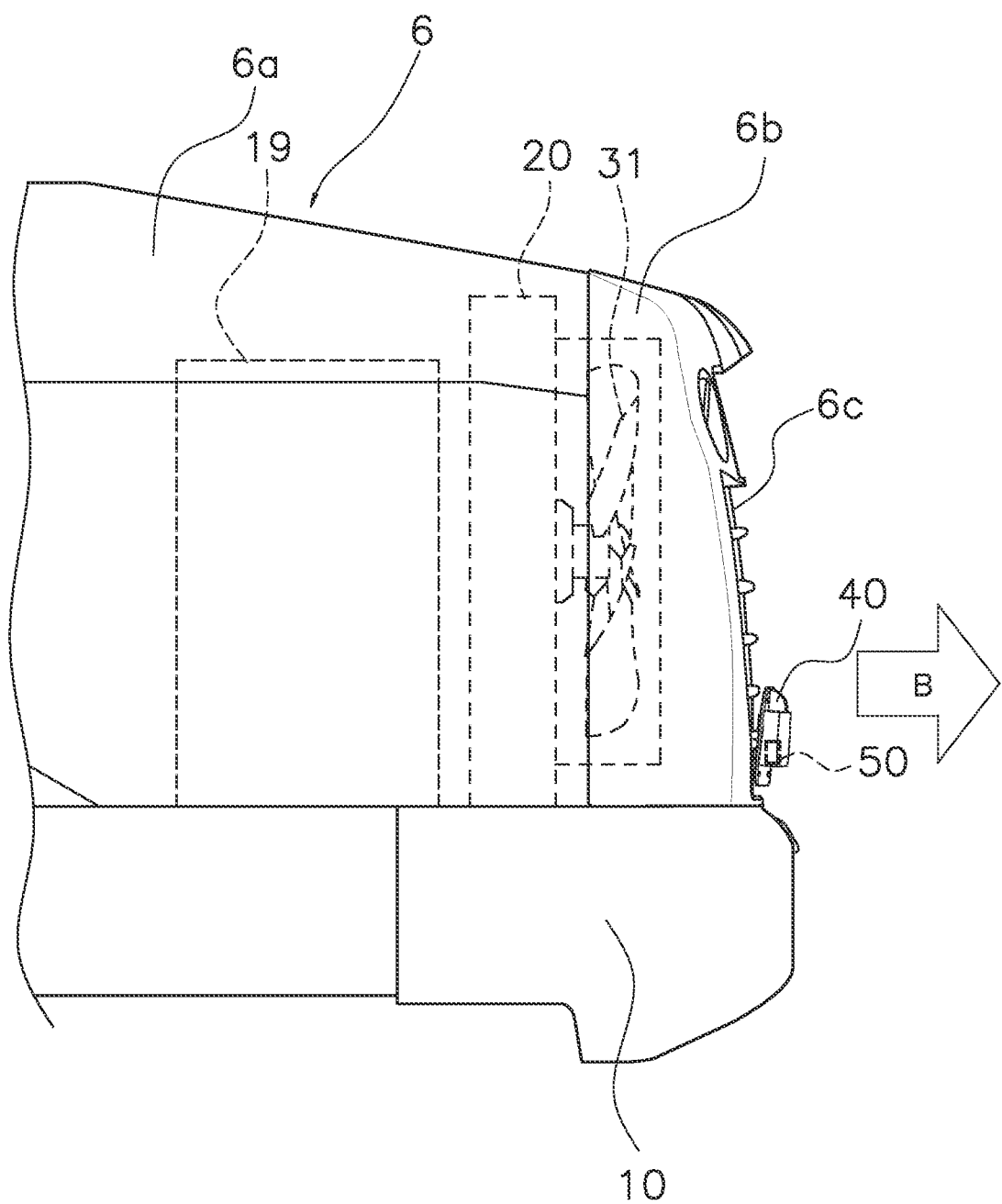
FIG. 3 is a side view illustrating the rear part of the wheel loader of the first embodiment according to the present disclosure.

FIG. 2A is a perspective view illustrating a rear part of the vehicle body 1. FIG. 3 is a side view illustrating the rear part of the vehicle body 1. As shown in FIG. 3, an engine 19, a radiator 20, and a fan 31 of a cooling device 30 are disposed in order from the front along the front-rear direction X inside the engine room C.

The engine room 6 includes a main body part 6a and a grille 6b. The main body part 6a is provided so as to form side plates that covers the front and left and right sides of the engine 19 and the radiator 20, and to form a top plate that covers the top of the engine 19 and the radiator 20.

The grille 6b is disposed at a rear end of the main body part Ca. The grille 6b is formed so as to cover the fan 31 in general. A grid-like opening 6c is formed in a rear surface of the grille 6b. Intake and exhaust are performed between the inside and the outside of the engine room 6 through the opening 6c. Although not shown, the grille 6b is rotatable upward or laterally with respect to the main body part 6a, so that the inside of the engine room 6 can be cleaned.

The radiator 20 cools, for example, cooling water for cooling the engine 19 by exchanging heat with air supplied by driving the fan 31.

In the cooling device 30 of the present embodiment, the fan 31 is disposed downstream of the radiator 20 which is an object to be cooled, and the fan 31 rotates to cool the radiator 20 in an exhaust state (see arrow B in FIG. 3). The exhaust state is a state in which air is discharged from the inside of the engine room 6 to the outside through the opening 6c. The intake state is a state in which air is sucked from the outside of the engine room 6 toward the inside through the opening 6c.

Next, the cooling device 30 that is able to switch the rotation of the fan 31 between the intake state and the exhaust state will be described.

FIG. 4 is a view illustrating configurations of the cooling device 30 and the control system. As shown in FIG. 4, the cooling device 30 includes the fan 31 described above, a hydraulic pump 32 (an example of a pump), a hydraulic fluid tank 33, a hydraulic motor 34 (an example of a motor), a first passage 35., a second passage 36, and a directional control valve 37.

The hydraulic pump 32 is rotationally driven by the shaft output of the engine 19. The hydraulic pump 32 sucks hydraulic fluid from the hydraulic fluid tank 33, discharges high pressure oil, and supplies the hydraulic fluid to the hydraulic motor 34.

The hydraulic motor 34 is driven by the hydraulic pressure supplied by the hydraulic pump 32 and rotates the fan 31 with shaft rotation output.

The first passage 35 and the second passage 36 connect the hydraulic pump 32 and the hydraulic fluid tank 33 to the hydraulic motor 34. The first passage 35 and the second passage 36 supply pressure oil supplied from the hydraulic pump 32 to the hydraulic motor 34 or discharge pressure oil supplied from the hydraulic pump 32 from the hydraulic motor 34.

The directional control valve 37 is provided in the middle of the first passage 35 and in the middle of the second passage 36. A portion of the first passage 35 from the hydraulic pump 32 to the directional control valve 37 is referred to as a passage portion 35a, and a portion of the first passage 35 from the directional control valve 37 to the hydraulic motor 34 is referred to as a passage portion 35b. A portion of the second passage 36 from the hydraulic fluid tank 33 to the directional control valve 37 is defined as a passage portion 36a, and a portion of the second passage 36 from the directional control valve 37 to the hydraulic motor 34 is defined as a passage portion 36b.

The directional control valve 37 is, for example, a 4-port 3-position directional control valve. The directional control valve 37 is a solenoid valve. The directional control valve 37 includes a valve body, and is able to switch so that the valve body is positioned at any one of a stop position P0, a first position P1, or a second position P2 based on a command signal from the controller 60. At the stop position P0, the supply and discharge of pressure oil are stopped, and the rotation of the hydraulic motor 34 is stopped.

When the directional control valve 37 is switched from the stop position P0 to the first position P1, the hydraulic fluid is supplied from the hydraulic pump 32 to the passage portion 35a, the passage portion 35b, the hydraulic motor 34, the passage portion 36b, the passage portion 36a, and the hydraulic fluid tank 33 in this order, and the hydraulic motor 34 rotates in the normal direction. On the other hand, when the directional control valve 37 is switched from the first position P1 to the second position P2, the hydraulic fluid is supplied from the hydraulic pump 32 to the passage portion 35a, the passage portion 36b, the hydraulic motor 34, the passage portion 35b, the passage portion 36a, and to the hydraulic fluid tank 33 in this order, and the hydraulic motor 34 rotates in the reverse direction.

In the present embodiment, when the hydraulic motor 34 rotates in the normal direction, the fan 31 rotates in the normal direction to enter the exhaust state. Further, when the hydraulic motor 34 rotates in the reverse direction, the fan 31 rotates in the reverse direction to enter the intake state.

That is, by driving the hydraulic pump 32 in a state in which the directional control valve 37 is switched to the first position P1, the fan 31 rotates in the normal direction to enter the exhaust state. Further, by driving the hydraulic pump 32 in a state in which the directional control valve 37 is switched to the second position P2, the fan 31 rotates in the reverse direction to enter the intake state.

(Radar Device 40)

The radar device 40 detects the presence of an obstacle S in the rear of the vehicle body 1, as shown in FIG. 1. In this embodiment, for example, as shown in FIG. 2A, two radar devices 40 are provided. One radar device 40 is provided on the left side of the central axis A in the left-right direction of the rear frame 12, and the other radar device 40 is provided on the right side of the central axis A. The two radar devices 40 are disposed symmetrically with the central axis A interposed therebetween. The number of radar devices 40 is not particularly limited. For example, one radar device 40 may be provided on the central axis A of the rear frame 12, or three or more may be provided.

The radar devices 40 are disposed above the counterweight 10. As shown in FIG. 2A and FIG. 3, the radar device 40 is disposed below the grille 6b and on the rear direction Xb side of the grille 6b. The radar devices 40 are fixed to the grille 6b.

The radar device 40 is, for example, a millimeter wave radar. The radar device 40 can measure the distance to an object by detecting, with the receiving antenna, the radio waves in the millimeter wave band which is emitted from the transmitting antenna and is returned after being reflected by the surface of the obstacle. A detection result by the radar device 40 is transmitted to a processor (not shown), and the processor can detect that an obstacle exists within a predetermined range when the wheel loader 100 is traveling in the rear direction.

Figure 2B:
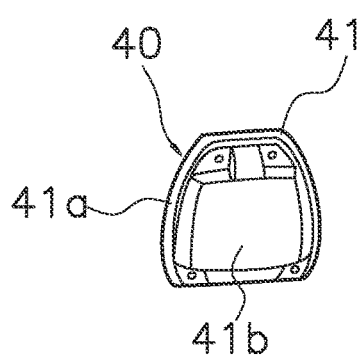
FIG. 2B is an enlarged view of the radar device of FIG. 2A.
Figure 2C:
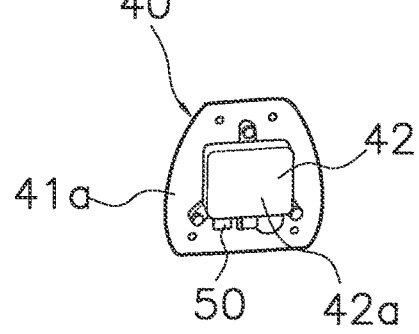
FIG. 2C is a view illustrating a state in which a cover is removed from FIG. 2B.

FIG. 2B is a perspective view of the radar device 40 as seen from the rear. FIG. 2C is a view illustrating a state in which the cover part 41b is removed from the configuration shown in FIG. 2B. The radar device 40 includes, for example, a housing 41 and a detector 42. The housing 41 accommodates detector 42. The housing 41 includes a support part 41a that supports the detector 42 and a cover part 41b that covers a surface of the detector 42. A support part 41a is fixed to the grille 6b. As shown in FIG. 2B, the detector 42 is fixed to a surface of the support part 41a of the housing 41. The detector 42 is provided with a transmit antenna and a receive antenna. The detector 42 is attached to the support part 41a so that the detection surface 42a faces to the rear direction.

(Temperature Sensor 50)

The temperature sensor 50 is disposed inside the housing 41 of the radar device 40, for example, as shown in FIG. 2C. The temperature sensor 50 measures the temperature inside the housing 41 of the radar device 40, but is not limited to this, and may measure the surface temperature of the radar device 40 (the detection surface 42a and the cover part 42b) in a non-contact manner.

When a plurality of radar devices 40 are provided as shown in FIG. 2B, the temperature sensor 50 may be provided in each radar device 40 or only in some of the radar devices.

A value detected by the temperature sensor 50 is transmitted to the controller 60 as a detection signal as shown in FIG. 4 which will be described later.

(Controller 60)

The controller 60 includes a processor and a storage device. The processor is, for example, a central processing unit (CPU). Alternatively, the processor may be a processor different from a CPU. The processor executes processing for controlling the wheel loader 100 in accordance with a program. The storage device includes a non-volatile memory such as a read-only memory (ROM) and a volatile memory such as a random access memory (RAM). The storage device may include an auxiliary storage device such as a hard disk or a solid state drive (SSD). The storage device is an example of a non-transitory computer-readable recording medium. The storage device stores data and a program for controlling the wheel loader 100. The storage device stores, for example, the data of belowmentioned thresholds.

The controller 60 normally controls the directional control valve 37 so that the valve body is positioned at the first position P1, and rotates the fan 31 in the normal direction to cool the radiator 20.

A value detected by the temperature sensor 50 is input to the controller 60 as a detection signal. The controller 60 stores a temperature threshold value, and when the value detected by the temperature sensor 50 exceeds the threshold value, the controller 60 controls the directional control valve 37 so that the valve body is positioned at the second position P2, and rotates the fan 31 in the reverse direction.

In this way, by rotating the fan 31 in the reverse direction, the fan 31 enters to the intake state and air from the outside hits the radar device 40 to cool the radar device 40, so it is possible to lower the temperature.

Although only one threshold may be used, the temperature threshold for switching from the exhaust state to the intake state and the temperature threshold for returning from the intake state to the exhaust state may be changed. In this case, it is preferable to lower the second threshold value of the temperature for returning to the exhaust state rather than the first threshold value of the temperature for changing to the intake state.

(Actions)

Figure 5:
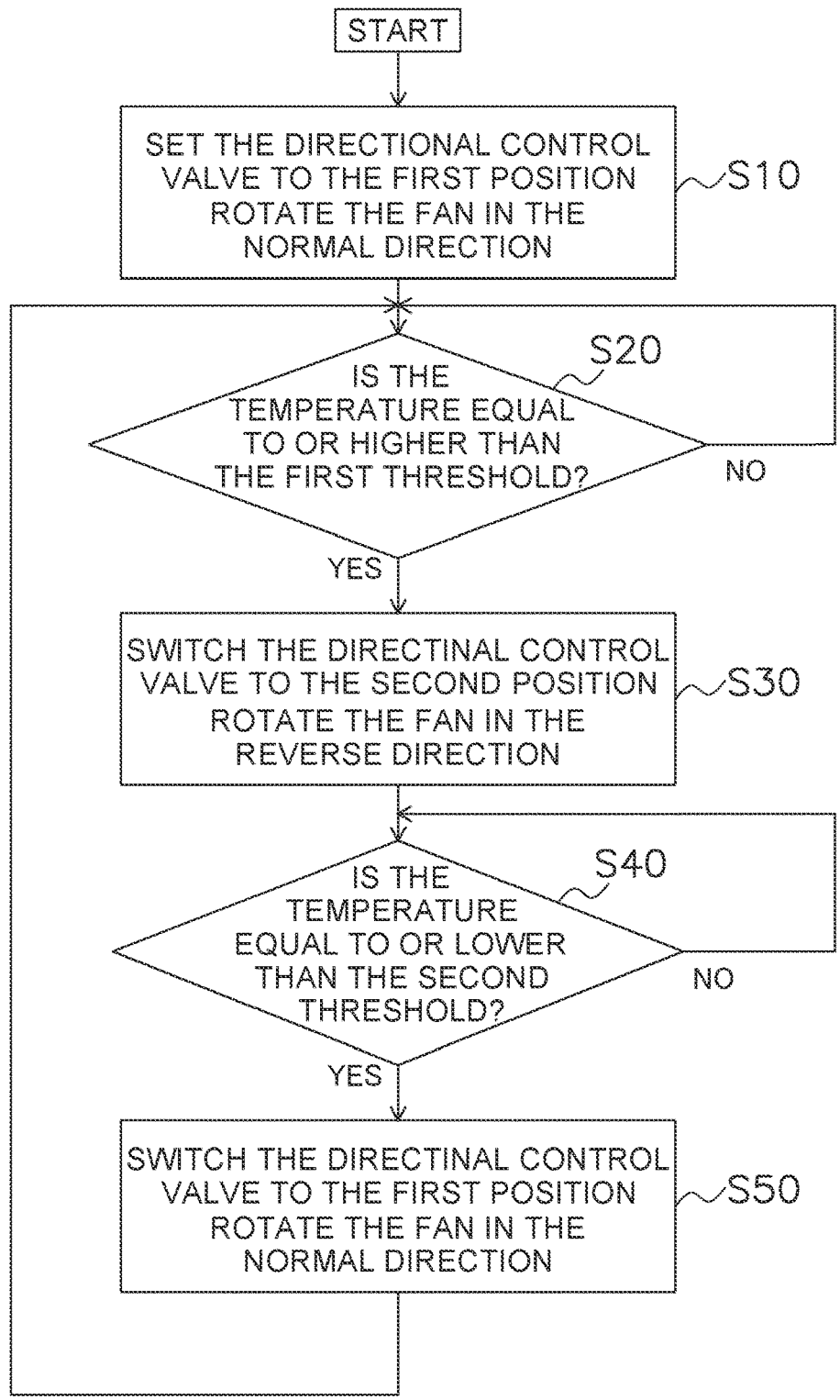
FIG. 5 is a flowchart illustrating control of the wheel loader of the first embodiment according to the present disclosure.

Next, control of wheel loader 100 in the present embodiment will be described. FIG. 5 is a flowchart illustrating control of wheel loader 100 of the present embodiment.

FIG. 5 shows a case where the second threshold value of the temperature when returning to the exhaust state is set lower than the first threshold value of the temperature when changing to the intake state.

First, in step S10, when the engine 19 of the wheel loader 100 is started, the controller 60 sets the directional control valve 37 to a state in which the valve body is disposed at the first position P1, drives the hydraulic pump 32 to rotate the fan 31 in the normal direction, and sets the fan 31 to the exhaust state.

Next, in step S20, the controller 60 determines whether the temperature of the radar device 40 detected by the temperature sensor 50 is equal to or higher than the first threshold. When the detected temperature is less than the first threshold, the control in step S20 is repeated to keep the fan 31 rotating in the normal direction.

On the other hand, when it is determined in step S20 that the temperature detected by the temperature sensor 50 is equal to or higher than the first threshold, the controller 60 switches the directional control valve 37 from the first position P1 to the second position P2 in step S30, rotate the fan 31 in the reverse direction, and sets the fan 31 to the intake state.

Next, in step S40, the controller 60 determines whether or not the temperature detected by the temperature sensor 50 is equal to or lower than the second threshold. When the detected temperature is higher than the second threshold, the control in step S40 is repeated to keep the fan 31 rotating in the reverse direction.

On the other hand, when it is determined in step S40 that the temperature detected by the temperature sensor 50 is equal to or lower than the second threshold, the controller 60 switches the directional control valve 37 from the second position P2 to the first position P1 in step S50, rotates the fan 31 in the normal direction, and sets the fan 31 to the exhaust state. After step S50, the control returns to step S20, and steps S20 to S50 are repeated until the engine 19 stops.

Note that when a plurality of temperature sensors 50 are provided such that the temperature sensor 50 is disposed in each of the plurality of radar devices 40, for example, in step S20, it is determined whether or not the temperature detected by any one of the temperature sensors 50 is equal to or higher than the first threshold, and when even one detected temperature exceeds the first threshold, the control proceeds to step S30. Also, in step S40, it is determined whether or not all the detected temperatures are equal to or lower than the second threshold, and when all the detected temperatures are equal to or lower than the second threshold, control proceeds to step S50.

As described above, when the temperature of the radar device 40 rises, the fan 31 is changed to the intake state from the exhaust state by rotating the fan 31 in the reverse direction. Thereby the air from the outside hits the radar device 40 and it is possible to cool the radar device 40 and to lower the temperature of the radar device 40. Further, when the temperature of the radar device 40 is lowered by air sucked from the outside, the radiator 20 can be cooled by returning to the exhausted state.

Embodiment 2

Next, the wheel loader 100 of the second embodiment according to the present disclosure will be described.

In the wheel loader 100 of the first embodiment, the radiator 20 is cooled in the exhaust state, but in the wheel loader 100 of the second embodiment, the radiator 20 is cooled in the intake state.

Figure 6:
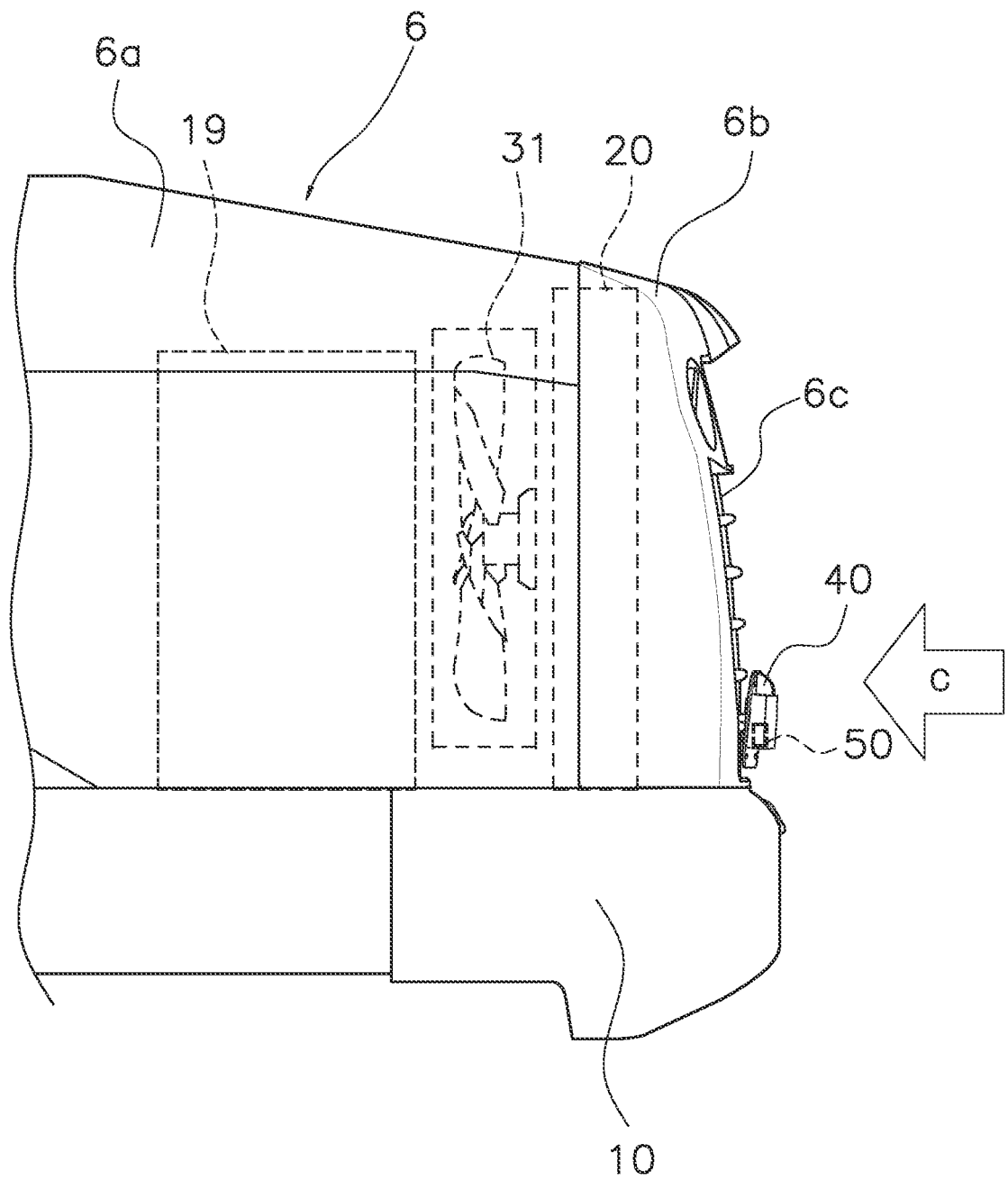
FIG. 6 is a perspective view illustrating the rear part in the wheel loader of a second embodiment according to the present disclosure.

FIG. 6 is a side view illustrating the rear part of the wheel loader 100 of the second embodiment. As shown in FIG. 6, in the wheel loader 100 of the second embodiment, the engine 19, the fan 31, and the radiator 20 are disposed in order from the front along the front-rear direction X, unlike the order in the first embodiment. With such a configuration, the radiator 20 can be cooled in the intake state (see arrow C).

Figure 7:
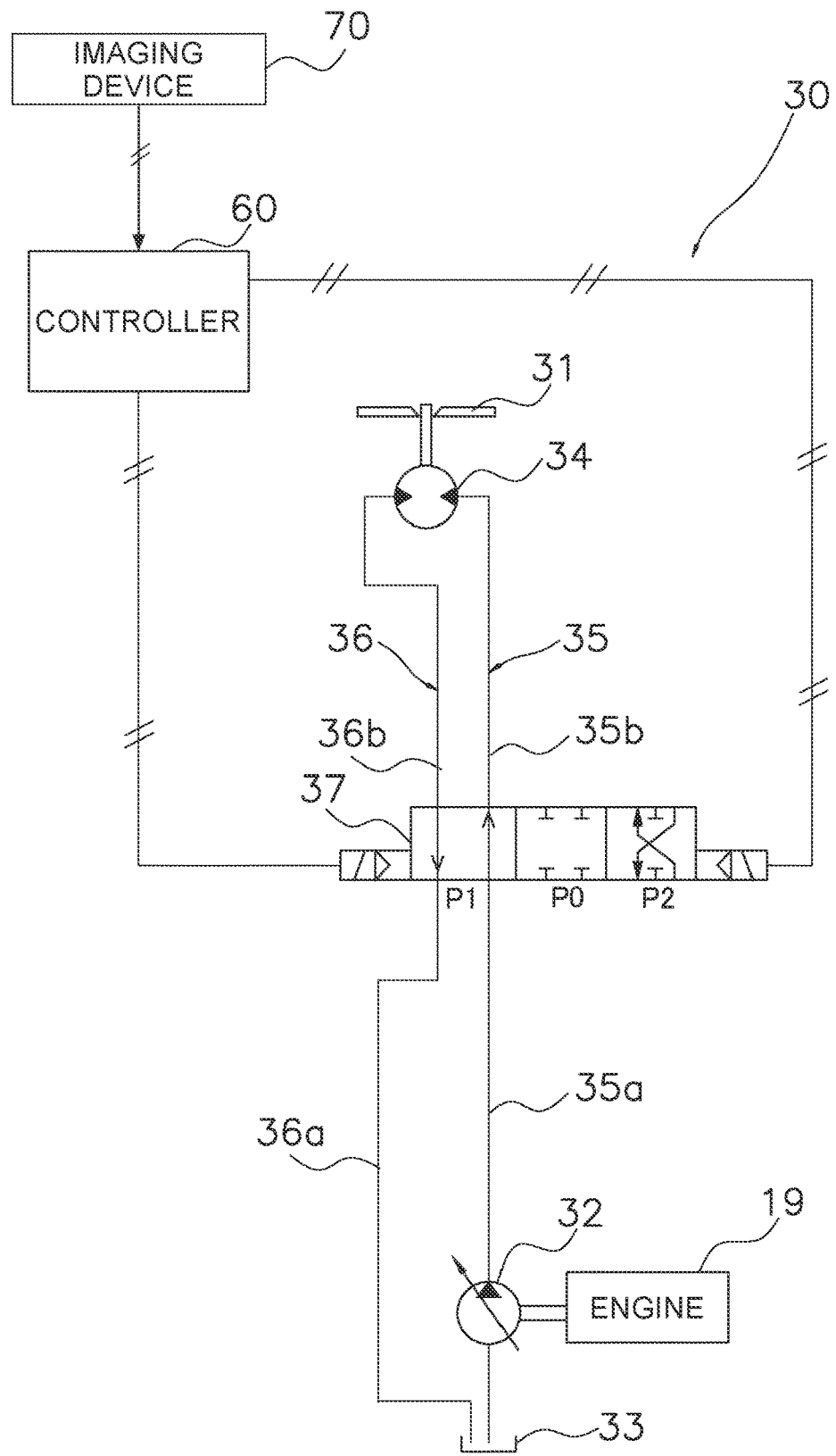
FIG. 7 is a diagram illustrating configurations of a cooling device and a control system in the wheel loader of the second embodiment according to the present disclosure.

FIG. 7 is a diagram illustrating the configurations of the cooling device 30 and the control of wheel loader 100 of the second embodiment. In the second embodiment, the fan 31 is installed so that the fan 31 enters the intake state by driving the hydraulic pump 32 to rotate fan 31 in the state in which the directional control valve 37 is set to the first position P1. Therefore, when the directional control valve 37 is set to the second position P2, the fan 31 enters the exhaust state by driving the hydraulic pump 32 to rotate the fan 31.

As shown in FIG. 7, the wheel loader 100 of the second embodiment includes an imaging device 70 instead of the temperature sensor 50. The imaging device 70 captures the surface state of the radar device 40. The imaging device 70 particularly captures the surface state of the surface (the surface from which the millimeter wave radar is emitted and incident) of the cover part 41*b* facing the rear of the radar device 40. The captured image data is transmitted to the controller 60. The controller 60 normally sets the directional control valve 37 to the first position P1 and sets the fan 31 to the intake state, and the controller 60 switches the directional control valve 37 to the second position P2 when determining that the surface of the radar device 40 is dirty by image analysis of the captured image data.

As a result, dirt such as dust adhering to the radar device 40 can be blown off and dirt can be reduced (Action)

Figure 8:
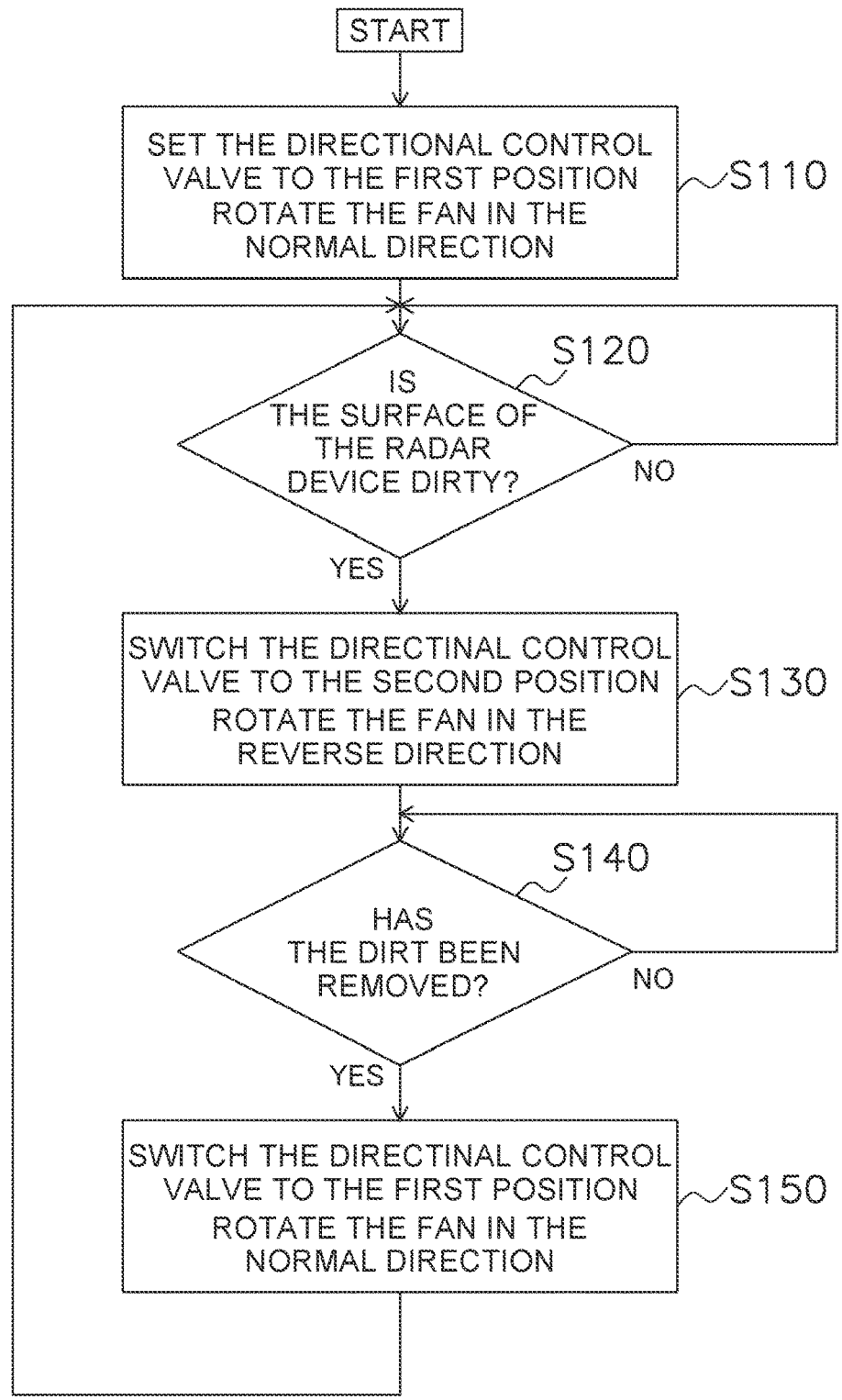
FIG. 8 is a flowchart illustrating control of the wheel loader of the second embodiment according to the present disclosure.

Next, control of the wheel loader 100 of the second embodiment will be described. FIG. 8 is a flowchart illustrating control of wheel loader 100 of the present embodiment.

First, in step S110, when the engine 19 of the wheel loader 100 is started, the controller 60 sets the directional control valve 37 to a state in which the valve body is disposed at the first position P1, drives the hydraulic pump 32 to rotate the fan 31 in the normal direction, and sets the fan to the intake state.

Next, in step S120, the controller 60 analyzes the image data captured by the imaging device 70 and determines whether or not the surface of the radar device 40 is dirty. Here, as a determination of whether or not it is dirty, for example, the case that the current image data is compared with the initial state and the surface gradation of the radar device 40 is darker than a predetermined gradation can be mentioned. Since the gradation can be obtained as a numerical value by, for example, black-and-white gradation of the image data, the predetermined gradation can also be set as a numerical value.

When it is determined that the surface of the radar device 40 is not dirty, the control of step S120 is repeated, and the fan 31 rotates in the normal direction to maintain the intake state.

On the other hand, when it is determined in step S120 that the surface of the radar device 40 is dirty, in step S130 the controller 60 switches the directional control valve 37 from the first position P1 to the second position P2 to rotate the fan 31 in the reverse rotation and sets the fan 31 to the exhaust state.

Next, in step S140, the controller 60 determines whether or not the dirt has been removed based on the image data detected by the imaging device 70. Here, the threshold value for determining whether or not the dirt has been removed in step S140 can be set to a value (closer to white) lower than the threshold value in step S120. When it is determined that the dirt has not been removed, the control of step S140 is repeated to maintain the exhaust state in which the fan 31 rotates in the reverse direction.

On the other hand, when it is determined in step S140 that the dirt has been removed, in step S150 the controller 60 switches the directional control valve 37 from the second position P2 to the first position P1 to rotate the fan 31 in the normal direction and sets the fan 31 to the intake state. After step S150, the control returns to step S120, and steps S120 to S150 are repeated until the engine 19 stops.

In the case that a plurality of radar devices 40 are provided, for example, when it is determined in step S120 that the surface of any one radar device is dirty, control proceeds to step S130. When it is determined in step S140 that dirt has been removed from the surfaces of all radar devices 40, control proceeds to step S150.

As described above, when the surface of the radar device 40 becomes dirty, the fan 31 is changed to the exhaust state from the intake state by rotating the fan 31 in the reverse direction. Thereby the air from the inside of the engine room 6 can be hit to the radar device 40 and it is possible to blow off dirt from the radar device 40. Further, when the dirt is removed, the fan 31 is returned to the intake state from the exhaust state, and the radiator 20 can be cooled.

(Characteristics)

(1)

The wheel loader 100 (an example of a work machine) of each of the first embodiment and the second embodiment include the vehicle body 1 that is able to travel, the fan 31, the radar device 40 (an example of an obstacle detection device), and a controller 60. The fan 31 exchanges air between the inside and the outside of the vehicle body 1 through the opening 6c provided toward the rear of the vehicle body 1. The radar device 40 is installed behind the fan 31 and detects an obstacle S in the rear of the vehicle body 1. The controller 60 controls the intake and exhaust of the fan 31 based on the state of the radar device 40.

As a result, for example, in the case of cooling normally in the exhaust state as in the first embodiment, the fan 31 is set to the intake state to reduce the temperature of the radar device 40 when the temperature of the radar device 40 rises. On the other hand, in the case of cooling normally in the intake state as in the second embodiment, when the dirt on the radar device 40 becomes heavy, the dirt on the radar device 40 can be removed by setting the fan 31 to the exhaust state.

Therefore, it is possible to suppress deterioration in the performance of the radar device 40 detecting an obstacle in the rear.

(2)

In wheel loader 100 (an example of a work machine) of the first embodiment, the fan 31 cools the inside of vehicle body 1 in the exhaust state in which air is exhausted from the inside of the vehicle body 1 to the outside.

As a result, when the temperature of the radar device 40 rises due to exhaust from the inside of the vehicle body 1 to the outside, the temperature of the radar device 40 can be lowered by setting the fan 31 to the intake state.

(3)

The wheel loader 100 (an example of a work machine) of the first embodiment further includes the temperature sensor 50. The temperature sensor 50 detects the temperature of the radar device 40. When the detected value of the temperature sensor 50 is equal to or higher than a predetermined temperature, the controller 60 controls the fan 31 so as to set from the exhaust state to the intake state in which air is sucked from the outside to the inside of the vehicle body 1.

As a result, it is possible to detect that the temperature of the radar device 40 has risen due to the exhaust from the inside of the vehicle body 1 to the outside, so that the temperature of the radar device 40 can be lowered by setting the fan 31 to the intake state.

(4)

In wheel loader 100 (an example of a work machine) of the second embodiment, the fan 31 cools the inside of vehicle body 1 in the intake state in which air is sucked from the outside of vehicle body 1 toward the inside.

As a result, when the radar device 40 becomes dirty due to the intake from the outside to the inside of the vehicle body 1, the fan 31 is set to the exhaust state to blow away the dirt and reduce the dirt on the radar device 40.

(5)

The wheel loader 100 (an example of a work machine) of the second embodiment further includes the imaging device 70 (an example of a dirt detector). The imaging device 70 detects dirt on the radar device 40. When the controller 60 determines that the radar device 40 is dirty based on the detection by the imaging device 70, the controller 60 controls the fan 31 so that air is exhausted from the inside of the vehicle body 1 to the outside.

As a result, it is possible to detect that the radar device 40 is dirty due to the intake from the outside to the inside of the vehicle body 1, so that the dirt of the radar device 40 can be reduced by setting the fan 31 to the exhaust state and blowing off the dirt.

(6)

In wheel loader 100 (an example of a work machine) of the second embodiment, the imaging device 70 (an example of an imaging section) captures the surface state of the radar device 40. The controller 60 determines dirt on the radar device 40 based on the image captured by the imaging device 70.

As a result, dirt on the radar device 40 can be detected based on the image captured by the imaging device 70.

(7)

The wheel loader 100 (an example of a work machine) of the first embodiment further includes the engine 19 and the radiator 20. The engine 19 is disposed inside the vehicle body 1. The radiator 20 is disposed between the fan 31 and the engine 19.

As a result, the inside of the vehicle body 1 is cooled in an exhaust state in which the air is exhausted from the inside of the vehicle body 1 toward the outside, and when the temperature of the radar device 40 rises, the temperature of the radar device 40 can be lowered by setting the fan 31 to the intake state.

(8)

In the wheel loader 100 (an example of a work machine) of each of the first embodiment and the second embodiment, the vehicle body 1 includes the vehicle body frame 2 and the work implement 3 attached to the front of the vehicle body frame 2.

Thereby, in the wheel loader 100 in which the work implement 3 is provided in front, it is possible to suppress deterioration in the performance of the radar device 40 that detects an obstacle in the rear.

(9)

The wheel loader 100 (an example of a work machine) of each of the first embodiment and the second embodiment includes the hydraulic pump 32 and the hydraulic motor 34. The hydraulic pump 32 is driven by the shaft output of the engine 19. The hydraulic motor 34 is driven by hydraulic fluid supplied from the hydraulic pump 32. The fan 31 is driven by the shaft rotation output of the hydraulic motor 34.

As a result, the fan 31 can be rotated by hydraulic drive.

OTHER EMBODIMENTS

Although an embodiment of the present invention has been described so far, the present invention is not limited to the above embodiment and various modifications may be made within the scope of the invention.

(A)

Figure 9:
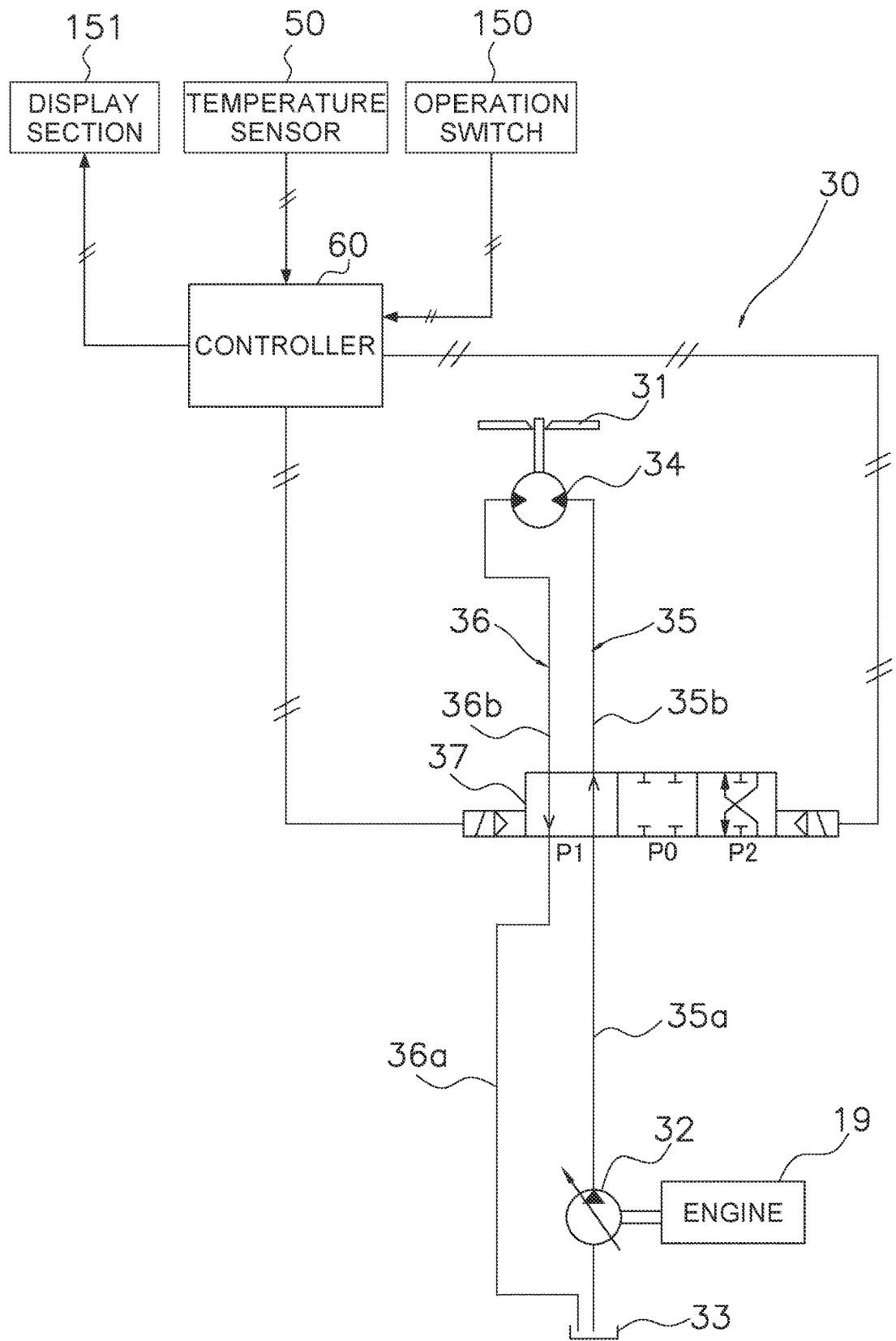
FIG. 9 is a diagram illustrating configurations of a cooling device and a control system in the wheel loader of a modified example of the first embodiment according to the present disclosure.

While in the first embodiment, the fan 31 is automatically controlled from the exhaust state to the intake state based on the detected value of the temperature sensor 50, the present invention is not limited to this. For example, as shown in FIG. 9, an operation switch 150 (an example of an operation section) for switching the rotation of the fan 31 between the normal rotation and the reverse rotation and a display section 151 for displaying the temperature detected by the temperature sensor 50 may be provided. In this case, the operator may check the display section 151 and press the operation switch 150 so as to properly set the fan 31 to the intake state based on the temperature displayed on the display section 151.

Accordingly, by the operator operating the operation switch 150 based on the temperature displayed on the display section 151, the fan 31 is set to the intake state and the temperature of the radar device 40 can be lowered. Also, the operator can return to the exhaust state from the intake state based on the displayed temperature.

(B)

Figure 10:
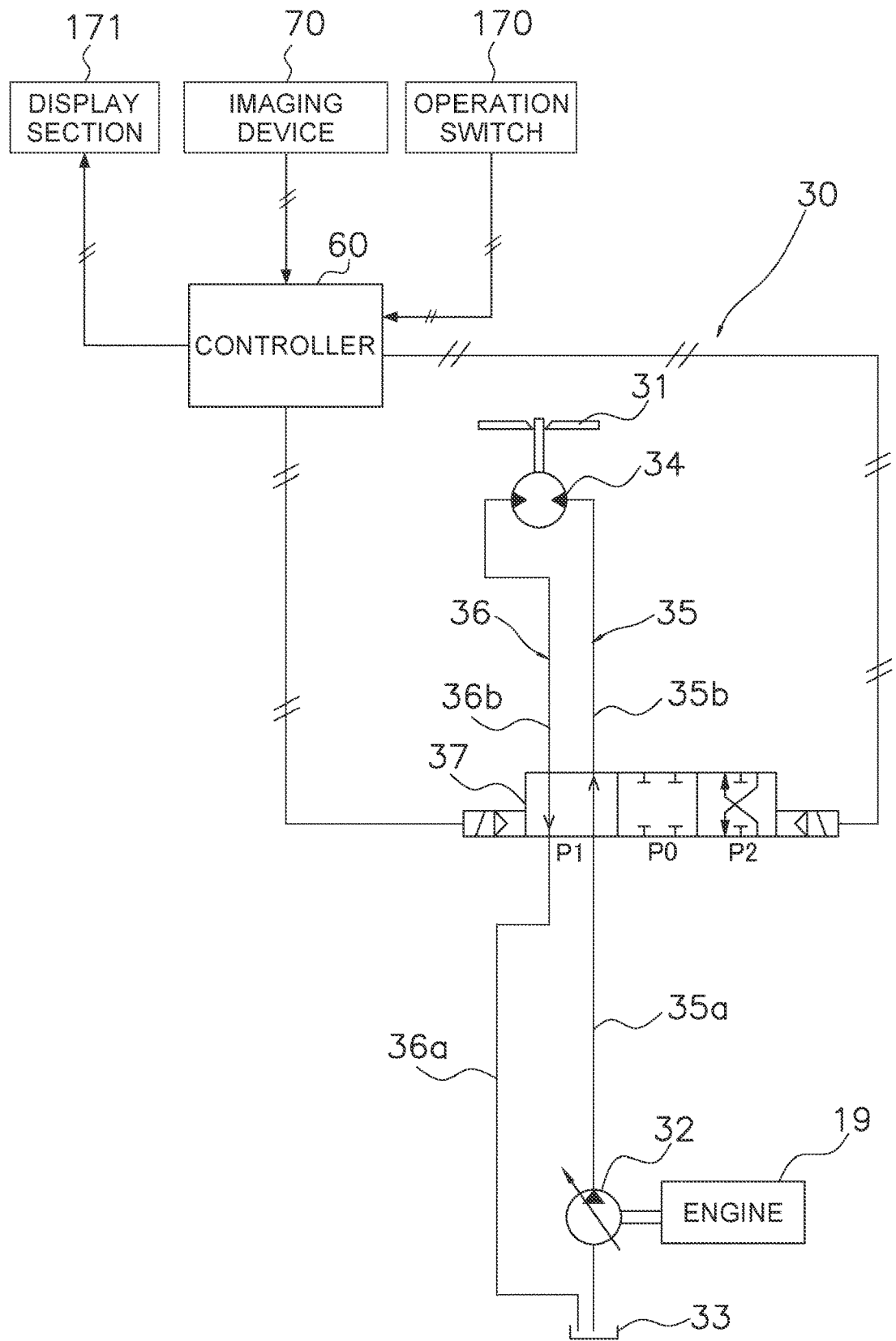
FIG. 10 is a diagram illustrating configurations of a cooling device and a control system in the wheel loader of a modified example of the second embodiment according to the present disclosure.

While in the above-described second embodiment, the fan 31 is automatically controlled from the intake state to the exhaust state based on the image data of the imaging device 70, the present invention is not limited to this. For example, as shown in FIG. 10, an operation switch 170 (an example of an operation section) for switching the rotation of the fan 31 between the normal rotation and the reverse rotation, and a display section 171 for displaying an image captured by the imaging device 70 may be provided. In this case, the operator may check the display section 171 and press the operation switch 170 so as to properly set the fan 31 to the exhaust state based on the image on the display section 171.

Accordingly, by the operator operating the operation switch 170 based on the image displayed on the display section 151, the fan 31 is set to the exhaust state and the dirt can be blown off from the radar device 40. In addition, the operator can return to the intake state when determining that the dirt has been removed based on the image.

(C)

While in the first embodiment, the fan 31 is automatically controlled from the exhaust state to the intake state based on the detected value of the temperature sensor 50, the temperature sensor 50 may not be provided. For example, the fan 31 may be automatically controlled so as to be in the intake state for a preset period at predetermined intervals during the operation of the engine 19.

In this manner, the temperature of the radar device 40 can be lowered by the controller 60 controlling the fan 31 from the exhaust state to the intake state at predetermined time intervals.

(D)

While in the above-described second embodiment, the fan 31 is automatically controlled from the intake state to the exhaust state based on the image data of the imaging device 70, the imaging device 70 may not be provided. For example, the fan 31 may be automatically controlled so as to be in the exhaust state for a preset period at predetermined intervals during the operating of the engine 19.

In this manner, dirt can be removed from the radar device 40 by the controller 60 controlling the fan 31 from the intake state to the exhaust state at predetermined time intervals.

(E)

While in the above-described second embodiment, dirt is detected using the imaging device 70 as an example of the dirt detector, but the dirt detector is not limited to this. For example, dirt on the surface of the radar device 40 may be detected using a reflective laser sensor or the like.

(F)

The arrangement of the radar devices 40 is not limited to the configuration of the above-described embodiments. One or a plurality of radar devices 40 may be disposed above or below one radar device 40 provided on the left side of the central axis A. Further, one or a plurality of radar devices 40 may be disposed above or below one radar device 40 provided on the right side of the central axis A.

(G)

In the above-described embodiments, the plurality of radar devices 40 are disposed symmetrically with respect to the central axis A, but they may not be disposed symmetrically.

(H)

While the radar devices 40 are fixed to the grille 6b in the above embodiments, the present invention is not limited to this. The radar device 40 may be attached to the counterweight 10, for example. When the radar device 40 is attached to the counterweight 10, the radar device 40 is not limited to being attached to the surface of the counterweight 10, and may be embedded.

(I)

While the wheel loader is used in the discussion as an example of a work machine in the above embodiments, the present invention is not limited thereto and the work machine may be a dump truck, motor grader, hydraulic excavator, forklift, or the like.

According to the work machine and the control method for the work machine of the present disclosure, it is possible to suppress deterioration in the performance of detecting an obstacle in the rear, and is useful as a wheel loader or the like.

What is claimed is:

1. A work machine comprising:
 a vehicle body configured to travel;
 a fan configured to exchange air between an inside and an outside of the vehicle body through an opening provided toward a rear of the vehicle body;
 an obstacle detection device installed behind the fan, the obstacle detection device being configured to detect an obstacle in the rear of the vehicle body;
 a controller configured to control intake and exhaust of the fan based on a state of the obstacle detection device; and
 a temperature sensor configured to detect a temperature of the obstacle detection device,
 the fan being configured to cool the inside of the vehicle body in an exhaust state in which air is exhausted from the inside of the vehicle body toward the outside, and
 the controller being further configured to control the fan so as to set from the exhaust state to an intake state in which air is sucked from the outside to the inside of the vehicle bod when a value detected by the temperature sensor is equal to or higher than a predetermined temperature.

2. The work machine according to claim 1, further comprising:
 an engine disposed the inside of the vehicle body, and
 a radiator disposed between the fan and the engine.

3. The work machine according to claim 1, wherein the vehicle body includes a vehicle body frame and a work implement attached in front of the vehicle body frame.

4. The work machine according to claim 1, further comprising:
a pump driven by a shaft output of the engine, and
a motor driven by hydraulic fluid supplied from the pump,
the fan being driven by a shaft rotation output of the motor.

5. The work machine according to claim 1, further comprising:
an operation section configured to switch the fan from the exhaust state to an intake state in which air is sucked from the outside of the vehicle body toward the inside through the opening,
the controller being configured to control the fan so as to set from the exhaust state to an intake state in which air is sucked from the outside of the vehicle body toward the inside based on an operation of the operation section.

6. The work machine according to claim 1, wherein
the controller is configured to control the fan so as to set from the exhaust state to an intake state in which air is sucked from the outside of the vehicle body toward the inside at predetermined time intervals.

7. A work machine comprising:
a vehicle body configured to travel;
a fan configured to exchange air between an inside and an outside of the vehicle body through an opening provided toward a rear of the vehicle body;
an obstacle detection device installed behind the fan, the obstacle detection device being configured to detect an obstacle in the rear of the vehicle body;
a controller configured to control intake and exhaust of the fan based on a state of the obstacle detection device; and
a dirt detector configured to detect dirt on the obstacle detection device,
the fan being configured to cool the inside of the vehicle body in an intake state in which air is sucked from the outside of the vehicle body toward the inside, and
the controller being further configured to control the fan so as to set from the intake state to an exhaust state in which air is exhausted from the inside of the vehicle body toward the outside when the controller determines that the obstacle detection device is dirty based on a detection by the dirt detector.

8. The work machine according to claim 7, further comprising:
an engine disposed in the vehicle body; and
a radiator disposed between the fan and the engine.

9. The work machine according to claim 7, wherein
the vehicle body includes a vehicle body frame and a work implement attached in front of the vehicle body frame.

10. The work machine according to claim 7, further comprising:
a pump driven by a shaft output of the engine, and
a motor driven by hydraulic fluid supplied from the pump,
the fan being driven by a shaft rotation output of the motor.

11. The work machine according to claim 7, wherein
the dirt detector is an imaging device configured to capture a surface state of the obstacle detection device, and
the controller is configured to determine dirt on the obstacle detection device based on an image captured by the imaging device.

* * * * *